United States Patent
Mooney

(10) Patent No.: US 6,580,189 B2
(45) Date of Patent: Jun. 17, 2003

(54) VIBRATORY MOTOR HAVING A SELF-CONTAINED CONTINUOUS BEARING LUBRICATION SYSTEM

(75) Inventor: James A. Mooney, Tonawanda, NY (US)

(73) Assignee: Derrick Manufacturing Corporation, Buffalo, NY (US)

( * ) Notice: Subject to any disclaimer, the term of this patent is extended or adjusted under 35 U.S.C. 154(b) by 0 days.

(21) Appl. No.: 09/911,910

(22) Filed: Jul. 24, 2001

(65) Prior Publication Data

US 2003/0020345 A1 Jan. 30, 2003

(51) Int. Cl.[7] .................................................. H02K 7/08
(52) U.S. Cl. ............................ 310/81; 310/90; 184/11.2
(58) Field of Search ......................... 184/5, 11.1, 11.2, 184/13.1, 100, 6.17; 74/87; 366/128; 310/90, 81

(56) References Cited

U.S. PATENT DOCUMENTS

| | | | |
|---|---|---|---|
| 1,919,522 A | | 7/1933 | Lipman |
| 1,982,937 A | | 12/1934 | Walter |
| 2,688,102 A | * | 8/1954 | Jackson .................... 184/105.1 |
| 2,750,160 A | * | 6/1956 | Englund et al. ............. 475/183 |
| 2,854,594 A | * | 9/1958 | Philippovic .................. 310/258 |
| 2,857,535 A | * | 10/1958 | Kroeckel et al. .............. 310/81 |
| 2,884,790 A | * | 5/1959 | Lehman ..................... 209/366.5 |
| 3,383,937 A | | 5/1968 | Toenne et al. |
| 3,446,505 A | * | 5/1969 | Morris ........................ 369/162 |
| 3,578,111 A | * | 5/1971 | Miller ............................ 184/6 |
| 3,718,209 A | * | 2/1973 | Moslo ......................... 184/100 |
| 3,757,148 A | * | 9/1973 | Philibert ....................... 310/81 |
| 4,635,352 A | | 1/1987 | Uhen |
| 4,688,324 A | | 8/1987 | Morrill |
| 6,161,650 A | | 12/2000 | Ostergaard et al. |

OTHER PUBLICATIONS

Derrick Manufacturing Corp. "Oil Path from Oil Lubricated Motor" print 10,000–01 dated Aug. 28, 2001.

* cited by examiner

Primary Examiner—Burton S. Mullins
(74) Attorney, Agent, or Firm—Joseph P. Gastel

(57) ABSTRACT

A vibratory motor for a vibratory screening machine including a housing having a main shaft mounting outer shafts at its ends with a slip connection therebetween, bearings mounted on the outer shafts, first lubricant chambers on opposite sides of each of the bearings with a conduit therebetween, eccentric weights on the opposite sides of each bearing in each of the first lubricant chambers, second lubricant chambers outwardly of the first lubricant chambers, ducts between each outermost first lubricant chamber and an adjacent second lubricant chamber, second conduits between the second lubricant chambers, and conduits including the hollow portion of the main shaft and bores in the main shaft and outer shafts for conducting lubricant from the second lubricant chambers to the bearings.

44 Claims, 8 Drawing Sheets

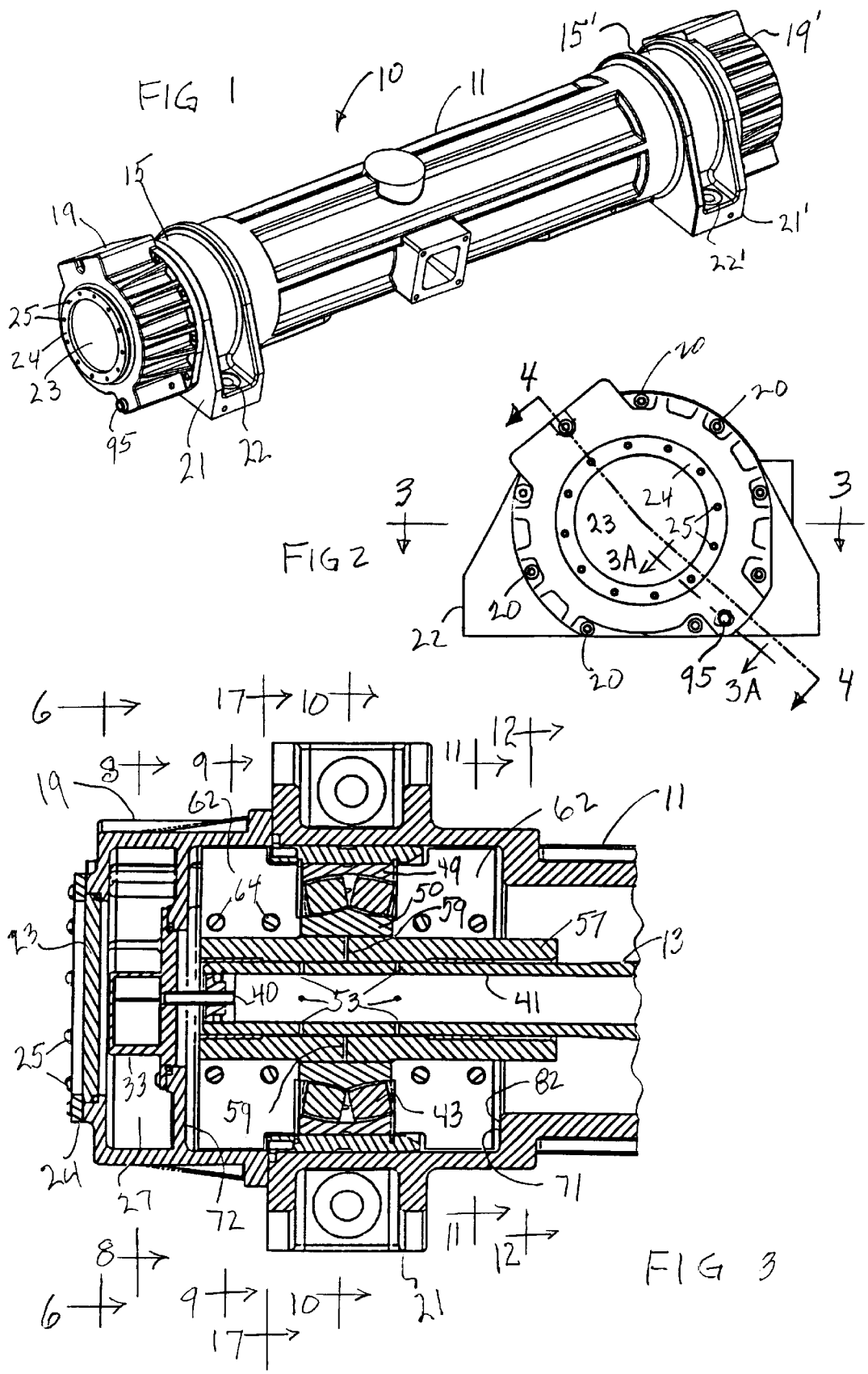

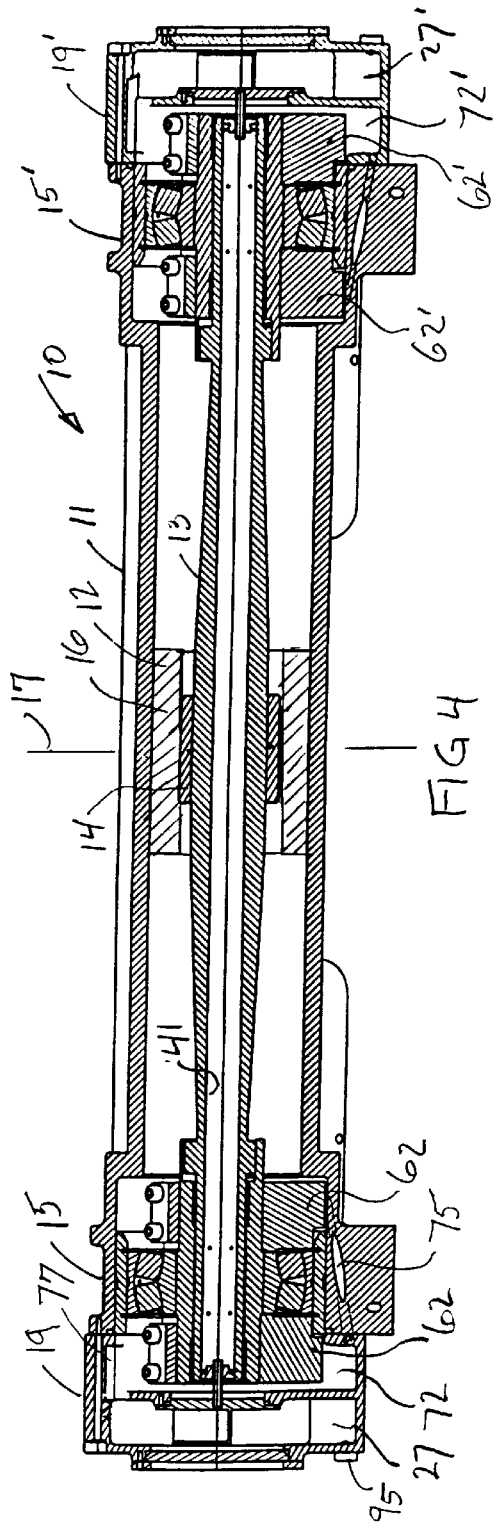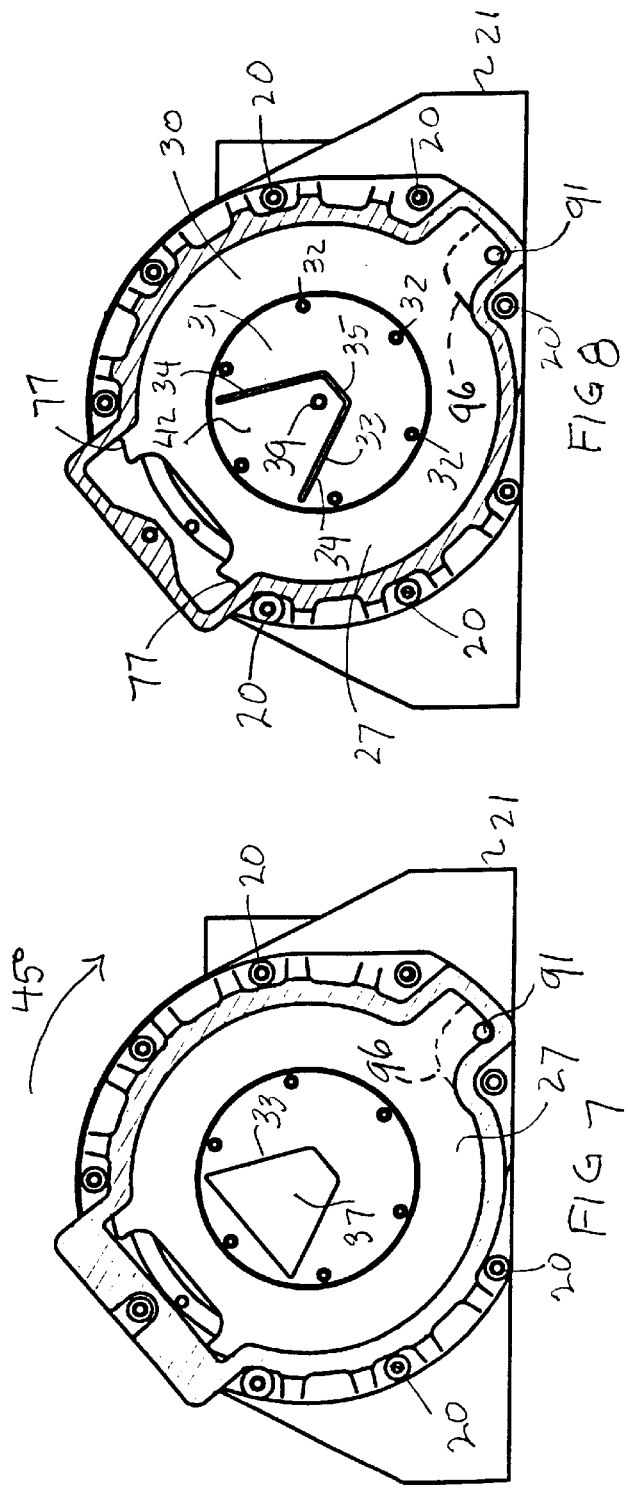

VIBRATORY MOTOR HAVING A SELF-CONTAINED CONTINUOUS BEARING LUBRICATION SYSTEM

BACKGROUND OF THE INVENTION

The present invention relates to a vibratory motor of the type which is used in a vibratory screening machine and which has a self-contained continuous lubrication system.

By way of background, vibratory motors are in use for vibrating the frame of a vibratory screening machine. Such motors apply extremely great stresses to the shaft bearings because of the violent vibrations which the motor produces because of both the size of the motor and the weight of the frame of the vibratory screening machine which the motor causes to vibrate. In the past, vibratory motors of the foregoing type required an external console which included a pumping mechanism for supplying lubricant to the motor. This was both costly and inefficient. Also in the past the main motor shaft was coupled directly to the bearing assembly which therefore transmitted undesirable forces from the main motor shaft to the bearings.

BRIEF SUMMARY OF THE INVENTION

It is an object of the present invention to provide a vibratory motor of the type used on a vibratory screening machine and which has an unique continuously circulating internal self-contained lubrication system.

It is another object of the present invention to provide a vibratory motor having an improved connection between its shaft and the bearings which support it so as to effectively reduce the transmission of vibration from the shaft to the bearings.

A further object of the present invention is to provide a vibratory motor of the type which is used on a vibratory screening machine and which has a self-contained lubrication system wherein the supply of lubricant to each of the bearings at the outer ends of the motor shaft is equalized, thereby assuring the adequate supply of lubricant to each of the bearings.

It is yet another object of the present invention to provide a vibratory motor for a vibratory screening machine which has an unique connection between the vibratory motor shaft and its associated bearing structure which compensates for manufacturing variations and thermal expansion and contraction due to temperature changes. Other objects and attendant advantages of the present invention will readily be perceived hereafter.

The present invention relates to a vibratory motor comprising a housing having first and second housing ends, a main shaft in said housing, first and second ends on said main shaft in said first and second housing ends, respectively, first and second outer shafts encircling said first and second ends of said main shaft, respectively, first and second keyed slidable connections between said first and second ends of said main shaft and said first and second outer shafts, respectively, and first and second bearings on said first and second outer shafts in said first and second housing ends, respectively.

The present invention also relates to a vibratory motor comprising a housing having first and second housing ends, a shaft in said housing, first and second shaft ends on said shaft in said first and second housing ends, first and second bearings on said first and second shaft ends, respectively, first and second eccentric weights on said first and second shaft ends, respectively, first and second lubricant chambers proximate said first and second shaft ends, respectively, and a lubricant conduit extending between said first and second lubricant chambers.

The present invention also relates to a vibratory motor comprising a housing having first and second housing ends, a shaft in said housing, first and second shaft ends on said shaft in said first and second housing ends, respectively, first and second bearings on said first and second shaft ends, respectively, a first lubricant chamber proximate said first shaft end, a second lubricant chamber proximate said second shaft end, a third lubricant chamber between said first bearing and said first lubricant chamber, a fourth lubricant chamber between said second bearing and said second lubricant chamber, a first eccentric weight on said first shaft end in said third lubricant chamber, a second eccentric weight on said second shaft end in said fourth lubricant chamber, a first duct between said third lubricant chamber and said first lubricant chamber, and a second duct between said fourth lubricant chamber and said second lubricant chamber.

The present invention also relates to a vibratory motor comprising a housing, a main shaft in said housing, a hollow interior in said main shaft, a shaft end on said main shaft, an outer shaft on said shaft end, a first clearance between said shaft end and said outer shaft, a plurality of first bores between said hollow interior and said first clearance, a bearing mounted on said outer shaft, a second clearance between said outer shaft and said bearing, and a plurality of second bores in said outer shaft between said first and second clearances.

The present invention also relates to a vibratory motor comprising a housing having first and second housing ends, a shaft in said housing, first and second ends on said shaft in said first and second housing ends, respectively, first and second bearings on said first and second ends of said shaft, respectively, first eccentric weights on opposite sides of said first bearing, second eccentric weights on opposite sides of said second bearing, first lubricant chambers on opposite sides of said first bearing, second lubricant chambers on opposite sides of said second bearing, a first conduit connecting said first lubricant chambers, a second conduit connecting said second lubricant chambers, a third lubricant chamber proximate one of said first lubricant chambers on the opposite side of said one first lubricant chamber from said first bearing, a fourth lubricant chamber proximate one of said second lubricant chambers on the opposite side of said one second lubricant chamber from said second bearing, at least one first duct between said one first lubricant chamber and said third lubricant chamber, and at least one second duct between said one second lubricant chamber and said fourth lubricant chamber.

The various aspects of the present invention will be more readily understood when the following portions of the specification are read in conjunction with the accompanying drawings wherein;

BRIEF DESCRIPTION OF THE SEVERAL VIEWS OF THE DRAWING

FIG. 1 is a perspective view of the improved vibratory motor of the present invention;

FIG. 2 is an end elevational view of the left end of the motor of FIG. 1;

FIG. 3 is a fragmentary cross sectional view taken substantially along line 3—3 of FIG. 2 and showing the bearing structure on the left end of the motor;

FIG. 4 is a cross sectional view taken substantially along line 4—4 of FIG. 2;

FIG. 7 is a cross sectional view taken substantially along line 7—7 of FIG. 5 with the parts rotated to the position of FIG. 6 as if line 7—7 were taken on FIG. 3;

FIG. 8 is a cross sectional view taken substantially along line 8—8 of FIG. 3;

DETAILED DESCRIPTION OF THE INVENTION

Figure 16:
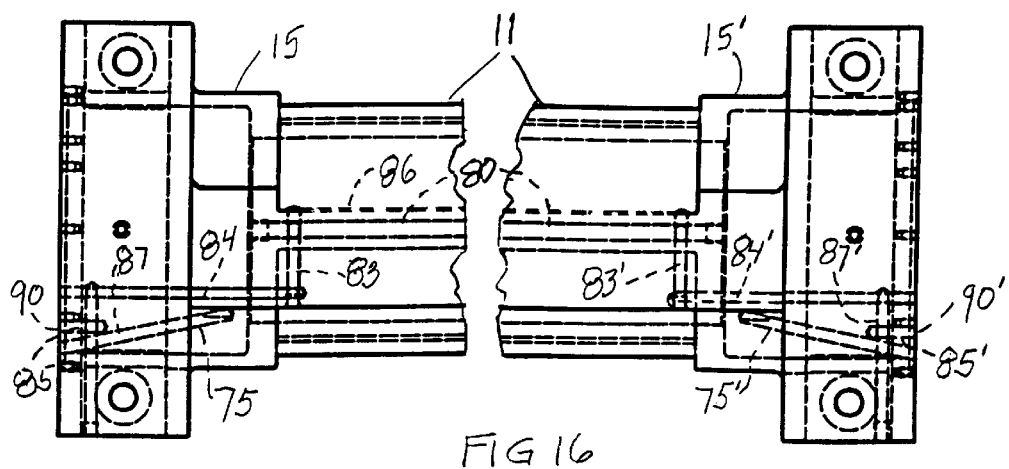
FIG. 16 is a fragmentary plan view showing the bores in the motor housing for conducting lubricant between the ends of the motor and between the various chambers of the motor.
Figure 17:
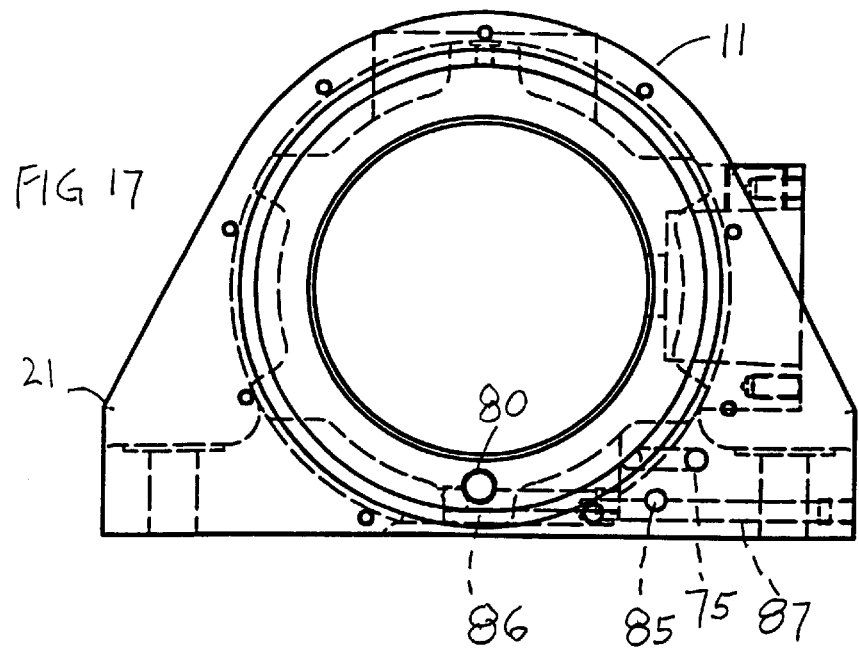
FIG. 17 is an elevational view of the end of the motor housing without the shaft or bearing therein taken substantially in the direction of arrows 17—17 of FIG. 3 and showing various lubricant bores.
Figure 18:
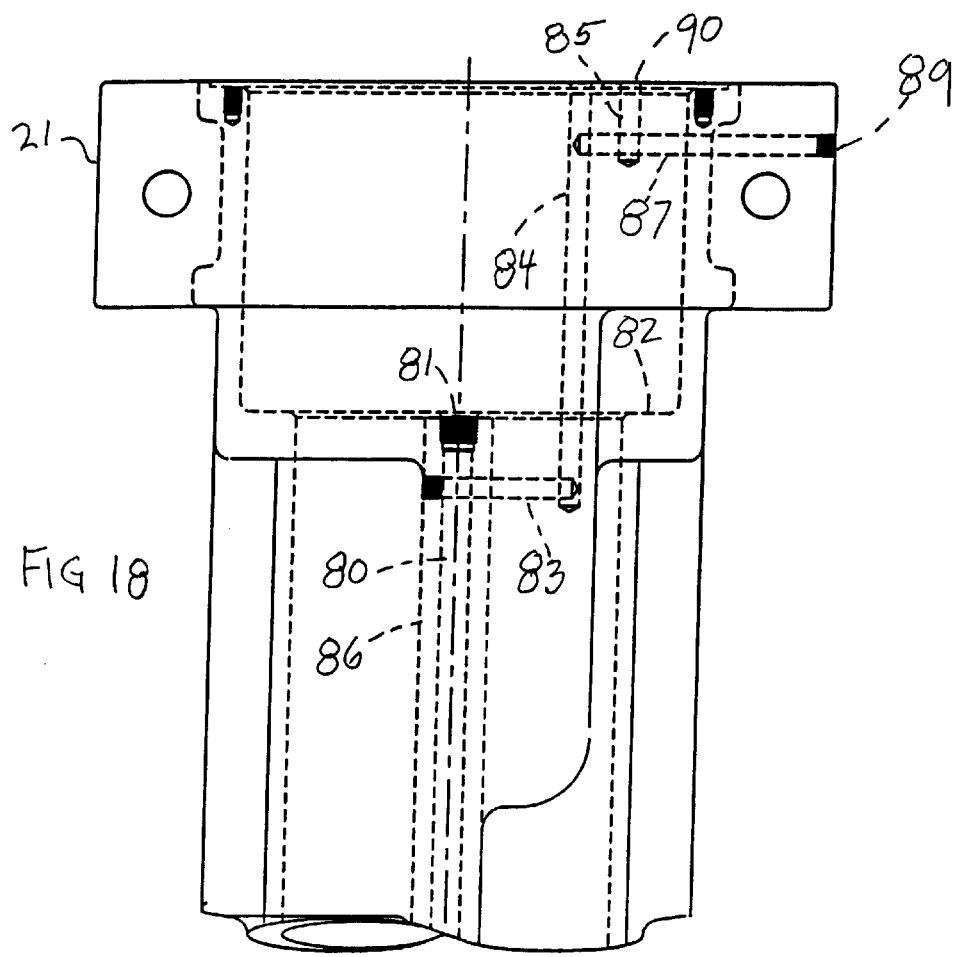
FIG. 18 is a fragmentary plan view of the left end of the motor housing and is a projection of FIG. 17.
Figure 5:
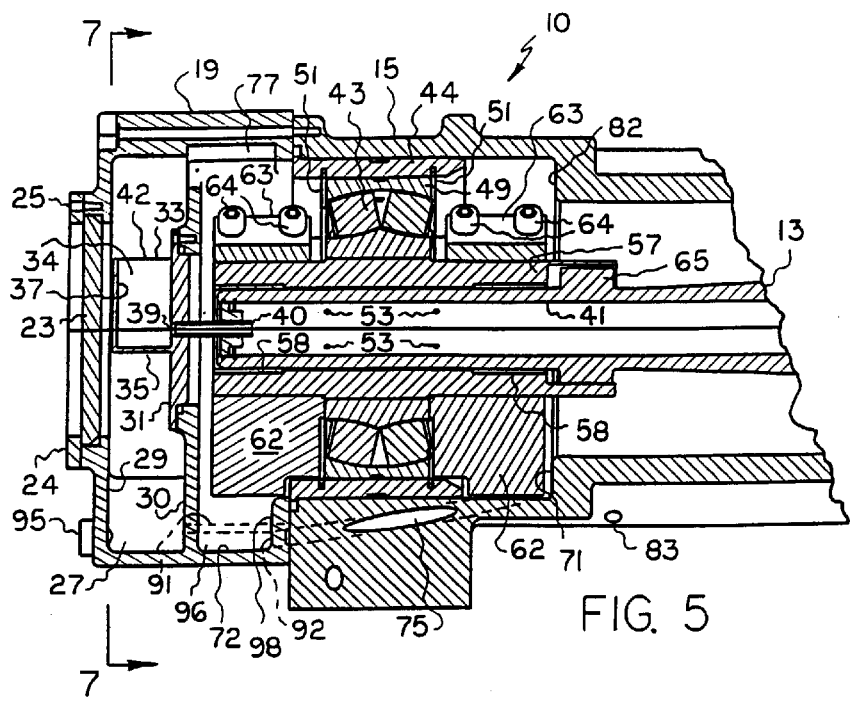
Figure 6:
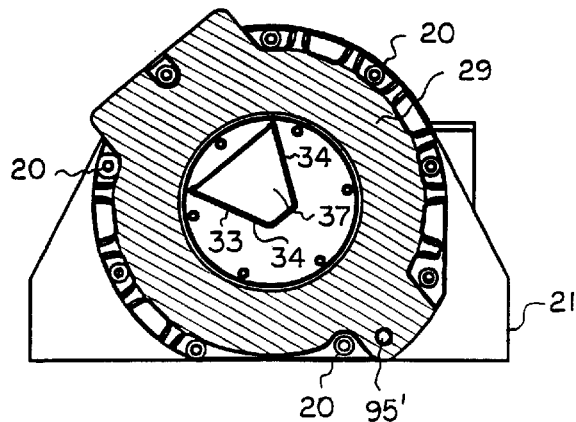
Figure 9:
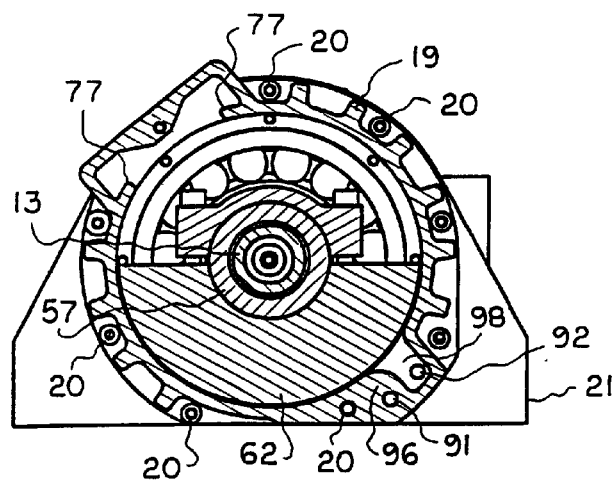
Figure 10:
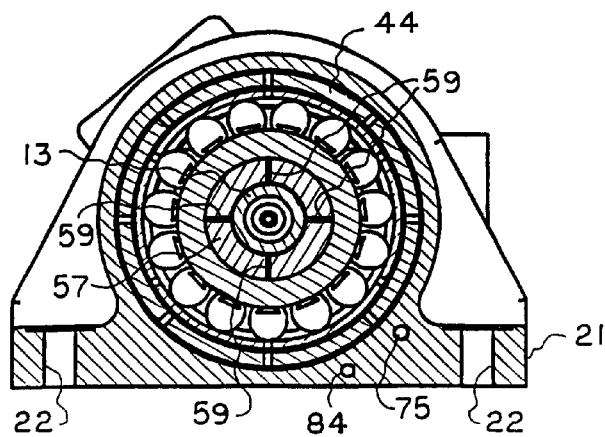
Figure 11:
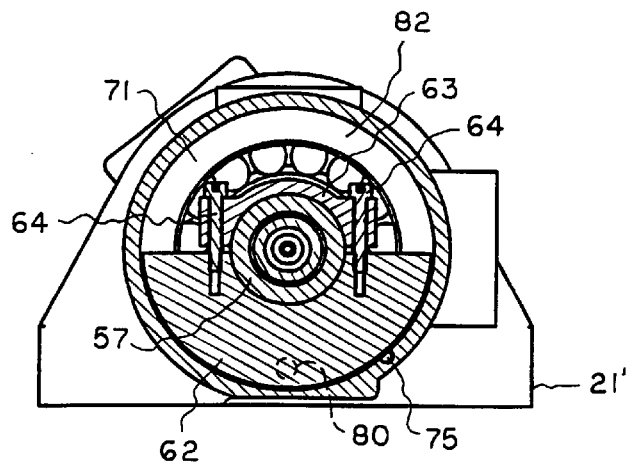
Figure 12:
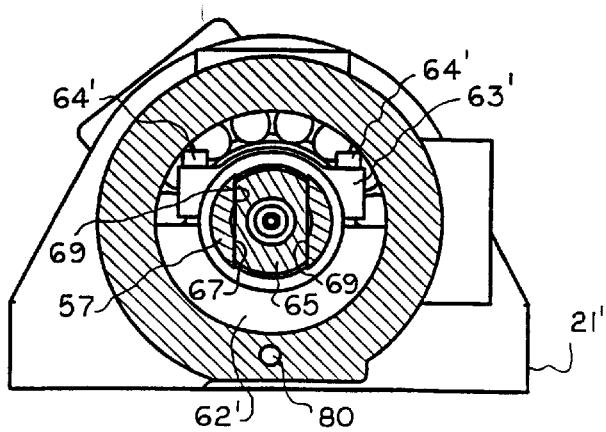
Figure 13:
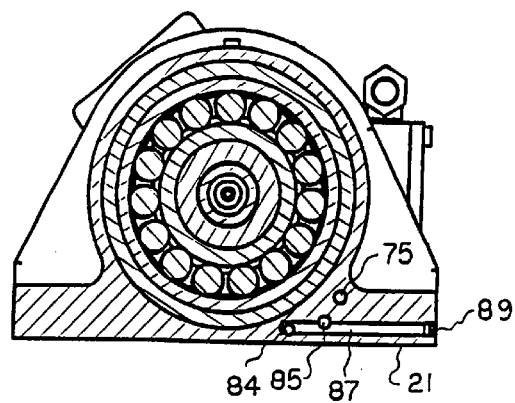

The improved vibratory motor 10 of the present invention (FIGS. 1 and 4) is especially intended for use on a frame of a vibratory screening machine, but it may be used on other devices if applicable thereto. The frame of the vibratory screening machine may weigh in excess of two tons. Motor 10 includes a housing 11 in which an electric motor 12 is suitably mounted. An elongated main shaft 13 having a rotor 14 thereon is also suitably mounted in housing ends 15 and 15'. A stator 16 is mounted within housing 11. At this point it is to be noted that vibratory motor 12 is substantially symmetrical about vertical centerline 17 (FIG. 4), and therefore the parts at the left end 15 are being designated by unprimed numerals, and any mirror-image counterparts at the right end which are referred to will be designated by primed numerals which correspond to the unprimed numerals. It will further be appreciated that not all parts at the right end of FIG. 4 will be designated by numerals, inasmuch as it is understood that there are all parts at the right end of the motor 10 in FIGS. 4 and 16 which correspond to the described parts at the left end thereof.

End caps 19 and 19' are suitably secured to the left and right ends 15 and 15', respectively, of housing 11 by bolts such as 20. Brackets 21 and 21' form parts of the left and right ends 15 and 15', respectively, and they include bores 22 for receiving bolts (not shown) for securing motor 10 to a vibratory screening machine (not shown).

Figure 13:
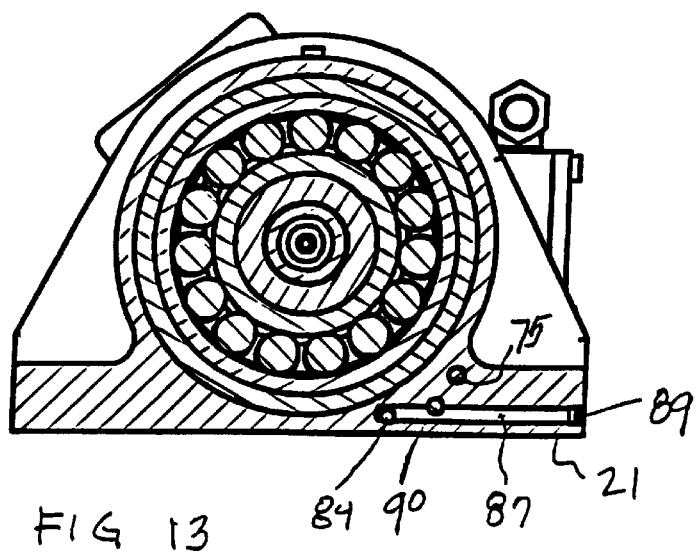
FIG. 13 is a cross sectional view taken substantially along line 13—13 of FIG. 15.
Figure 3A:
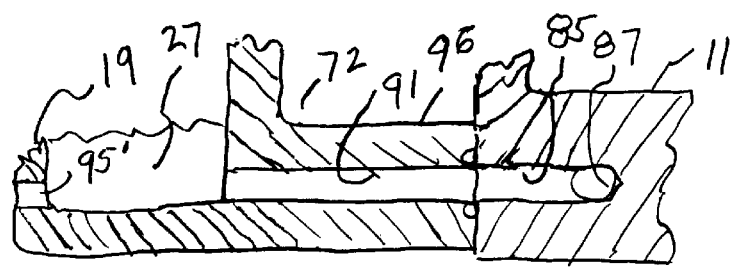
FIG. 3A is an enlarged fragmentary schematic view taken substantially along line 3A—3A of FIG. 3.
Figure 3A:
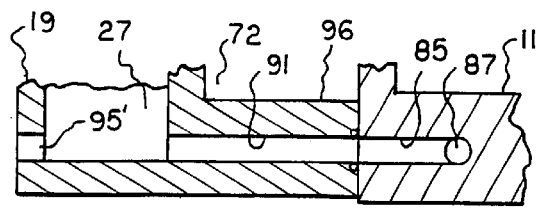
Figure 15A:
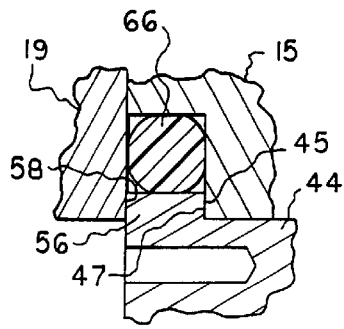
Figure 14:
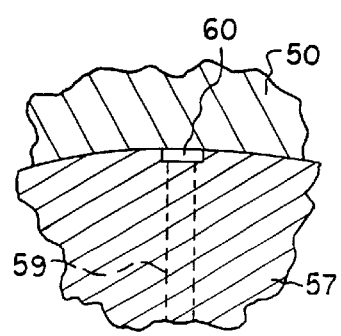
Figure 15:
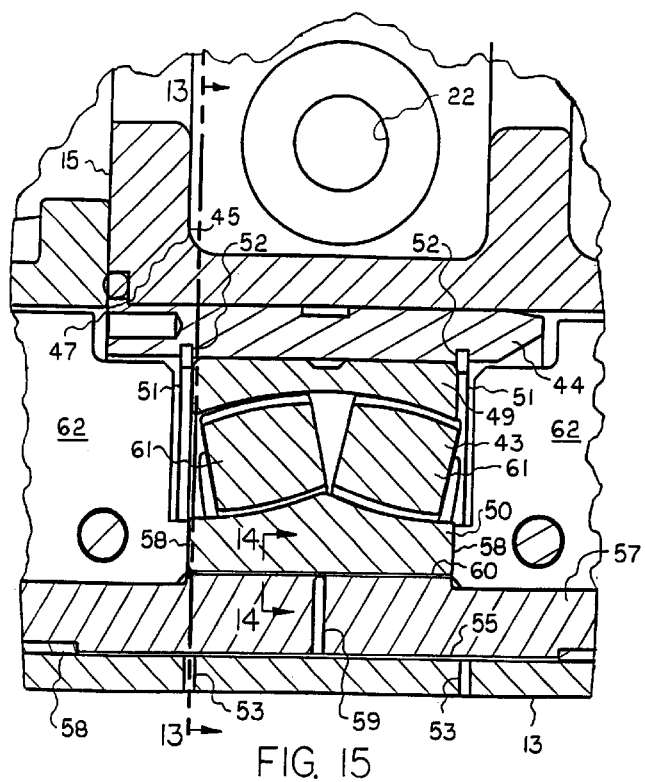
Figure 16:
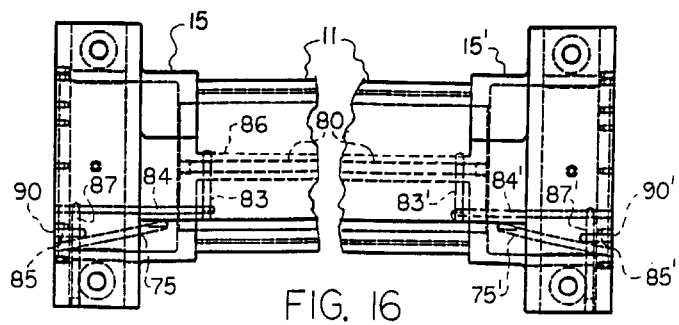
Figure 17:
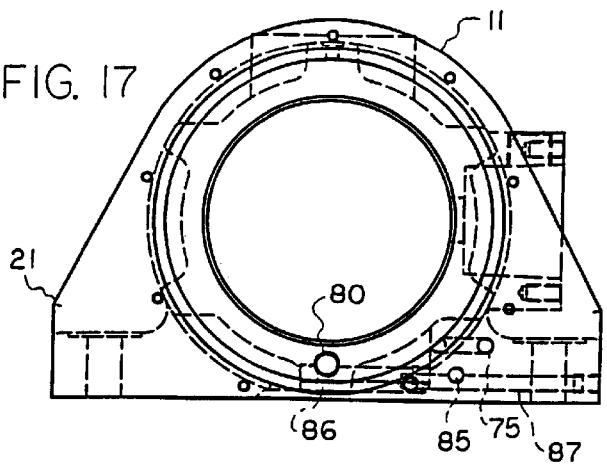
Figure 18:
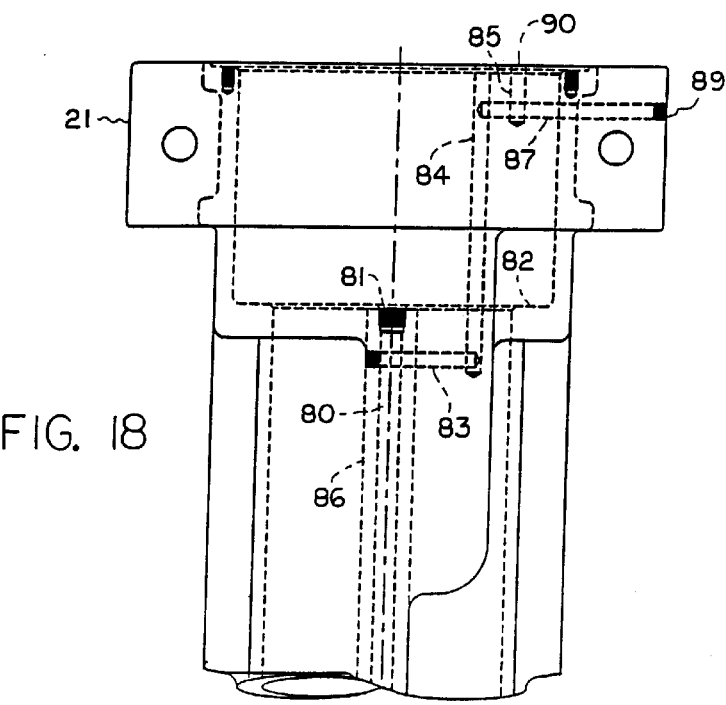

The motor 10 includes a lubrication system and unique connections at the outer ends of shaft 13 for enhancing the longevity of the bearings. End cap 19 includes a transparent plastic disc 23 which is secured to end cap 19 by ring 24 which is secured to end cap 19 by a plurality of bolts 25. A chamber 27 is located in end cap 19 and defined by wall 29 which includes window 23 (FIGS. 3 and 5) and wall 30 (FIGS. 5 and 8) which includes a disc 31 secured to wall 30 by a plurality of bolts 32 (FIG. 8). A funnel 33 (FIGS. 5, 6, 7 and 8) has two side walls 34 (FIGS. 5, 6 and 8) extending outwardly from disc 31 and a bottom wall 35 also extending outwardly from disc 31 and joining the bottoms of side walls 34. Funnel 33 also has an end wall 37 (FIGS. 5, 6 and 7) connected to the outer edges of side walls 34 and bottom wall 35. Disc 31 has a bore 39 (FIGS. 5 and 8) therein which is in communication with a conduit in the form of a tube 40 (FIGS. 3 and 5) leading to the hollow inside 41 (FIGS. 3, 4 and 5) of main shaft 13. As the motor 10 operates, the vibrations will cause the lubricant in chamber 27 to splash violently and enter the open top 42 (FIGS. 5 and 8) of funnel 33 and thereafter pass through bore 39 (FIG. 8) and tube 40 and into the hollow inside 41 of shaft 13.

Figure 10:
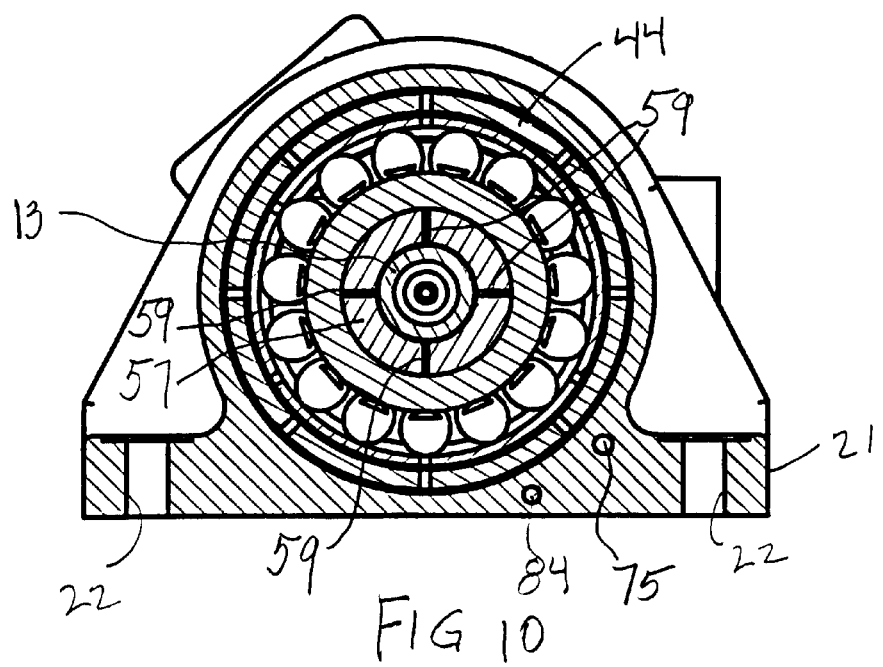
FIG. 10 is a cross sectional view taken substantially along line 10—10 of FIG. 3.
Figure 11:
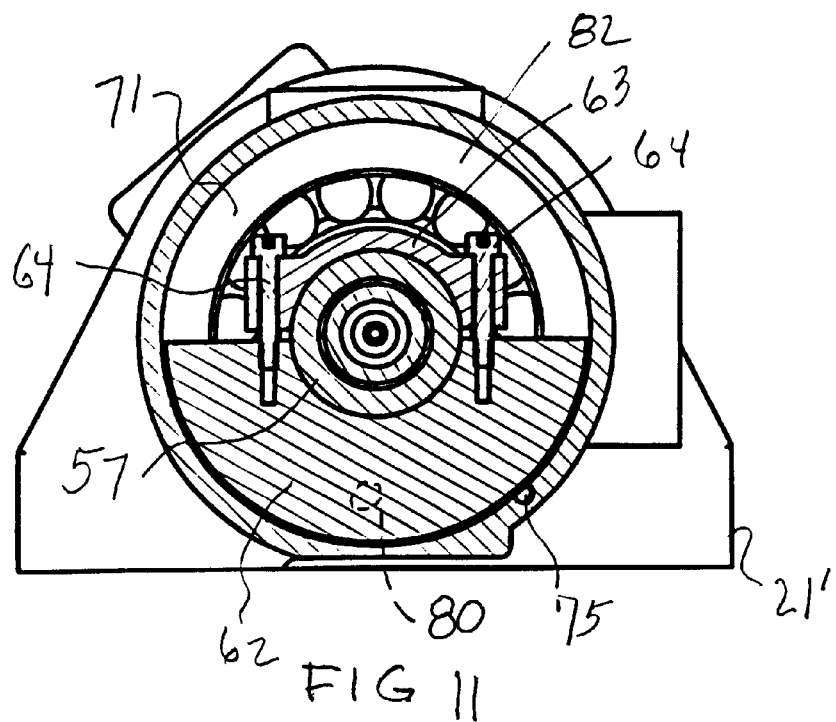
FIG. 11 is a cross sectional view taken substantially along line 11—11 of FIG. 3.
Figure 12:
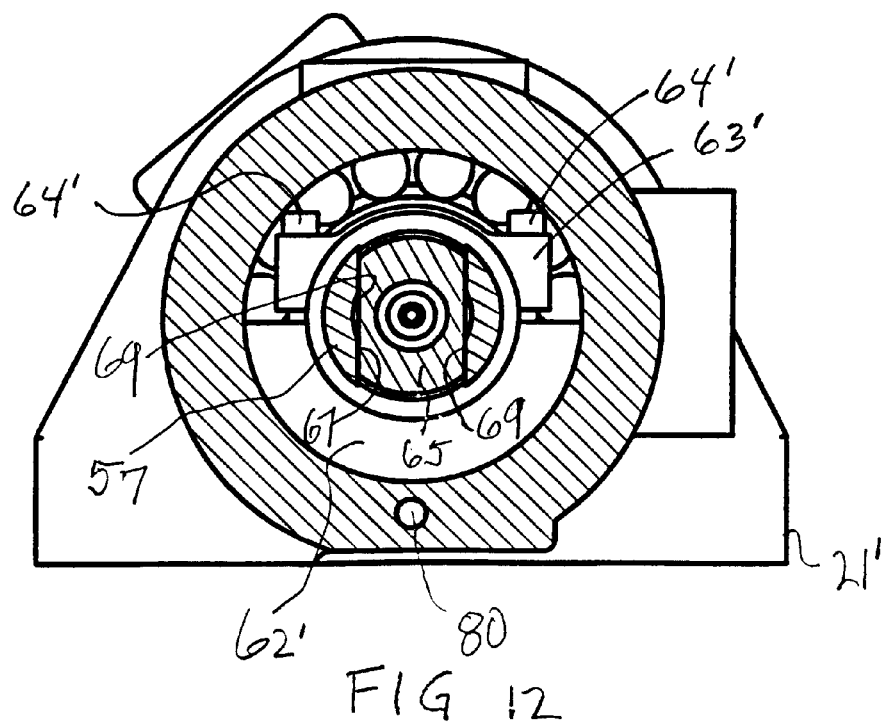
FIG. 12 is a cross sectional view taken substantially along line 12—12 of FIG. 3.

The lubricant is then conducted to the roller bearing 43 which is mounted in housing end 15 in the following manner. A sleeve 44 (FIGS. 5, 10 and 15) is shrunk-fitted into motor end 15 (FIGS. 5 and 15) and it has an annular shoulder 45 (FIG. 15A) which bears against annular shoulder 47 of housing end 15 to thereby position it in its proper location. The roller bearing 43 has an outer race 49 and an inner race 50. The bearing 43 is retained in position within annular sleeve 44 by annular retaining rings 51 which have their outer edges received in annular grooves 52 in sleeve 44.

Figure 14:
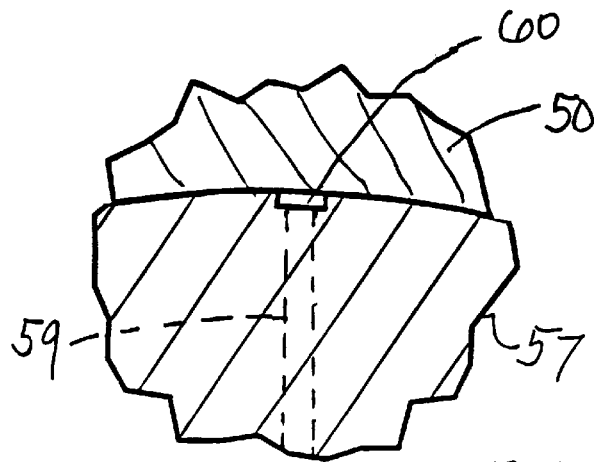
FIG. 14 is a fragmentary enlarged cross sectional view taken substantially along line 14—14 of FIG. 15.

As noted previously, lubricant is supplied to the hollow inside 41 of shaft 13. The lubricant then travels outwardly through bores 53 in shaft 13 (FIGS. 3, 5 and 15) as the shaft rotates. In this respect, as can be seen from the drawings, there are two series of four bores 53. The two series are axially spaced from each other, and each series comprises four bores 53 spaced 90° apart. The lubricant travels outwardly through bores 53 and into very narrow clearance space 55 (FIG. 15) between main shaft 13 and outer shaft 57 (FIGS. 5, 7, 11, 12, 13 and 14) mounted thereon. The sleeve bearings 58 (FIG. 5) act as seals to confine the lubricant to annular space 55 between them. The lubricant then travels outwardly through four bores 59 (FIGS. 3, 10 and 15) in outer shaft 57 and thereafter into the four axial slots 60 (FIGS. 14 and 15) between outer shaft 57 and inner race 50 of roller bearing 43. Each slot 60 in the outer surface of outer shaft 57 is aligned with a radial bore 59 in outer shaft 57. The lubricant thereafter is supplied to the rollers 61 between the inner and outer races.

Substantially semi-cylindrical eccentric weights 62 (FIGS. 3, 4, 5, 9, 11, 12) are clamped onto outer shaft 57 by yoke-like clamping members 63 (FIGS. 5 and 11) and bolts 64. These weights effect the vibration of motor 12 as they are rotated.

Figure 15A:
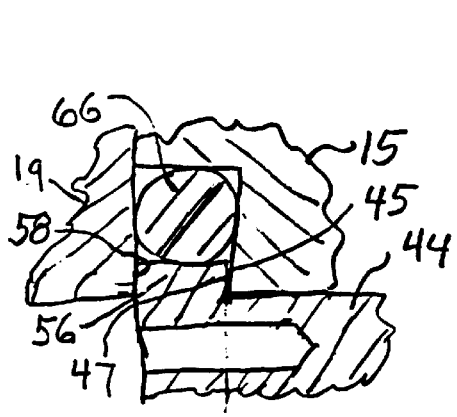
FIG. 15A is an enlarged fragmentary view of a portion of FIG. 15.
Figure 15:
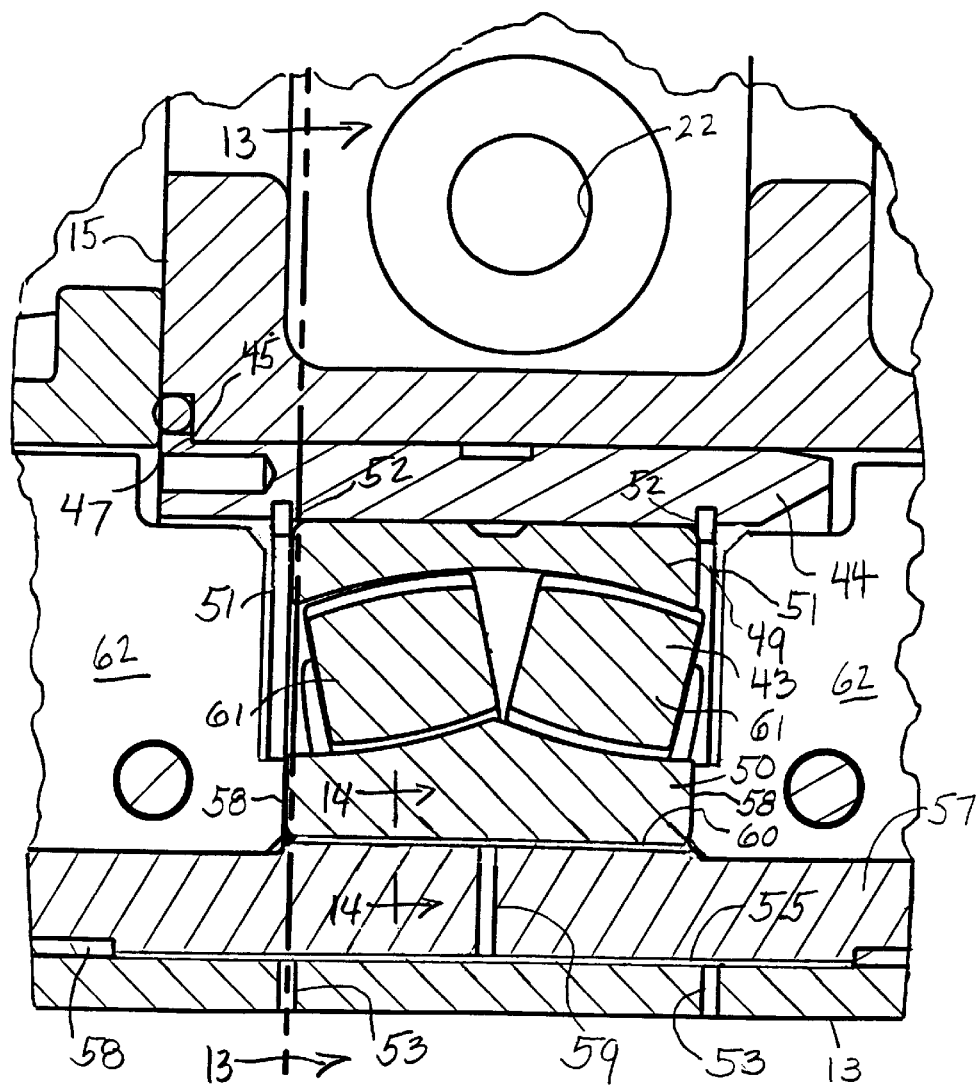
FIG. 15 is a fragmentary enlarged cross sectional view of a portion of FIG. 3.

The bearing 43 is held against axial movement relative to housing 15. In this respect, sleeve 44 is held against axial movement because of its shrink-fit connection, and because annular rim 56 (FIG. 15A) of sleeve 44 is clamped between shoulder 45 of housing end 15 and the annular edge 58 of cap 19. Bearing 43 is held against axial movement by retaining rings 51 and because it is press-fitted into sleeve 44. The inner race 50 of bearing 43 is also held against axial movement because of its construction relative to the remainder of the bearing, and the outer shaft 57 is also held against axial movement relative to bearing 43 because it is press-fitted into race 50. Also the central inner edges of weights 52 press against the opposite sides of inner race 50 of bearing 43 at 58 thereby further securing outer shaft 57 against axial movement. An O-ring seal 66 is installed as shown in FIG. 15A.

The main shaft 13 can move axially relative to stationary outer shaft 57 during motor vibration because of a slidable connection therebetween. The bearing 43 is mounted between stationary sleeve 44 and stationary outer shaft 57, and it is therefore held against axial movement. Any axial movement of main shaft 13 due to motor vibration will not be transmitted to bearing 43, thereby enhancing its longevity. More specifically, there is a keyed slip connection between the main shaft 13 and the outer shaft 57. The slip connection includes a substantially key-like configuration 65 (FIGS. 5 and 12) on shaft 13 which fits between side walls 69 of slot 67 of outer shaft 57 so that shaft 13 drives outer shaft 57 while permitting relative axial movement therebetween. Annular bearings 58 (FIG. 5) are positioned between shaft 13 and outer shaft 57. In addition, the slidable connection compensates for temperature and manufacturing variations. In addition, the bearing assembly at each end of the housing 11 can be installed in position independently of the other and independently of the position of shaft 13 because of the above-described slidable connection.

Figure 5:
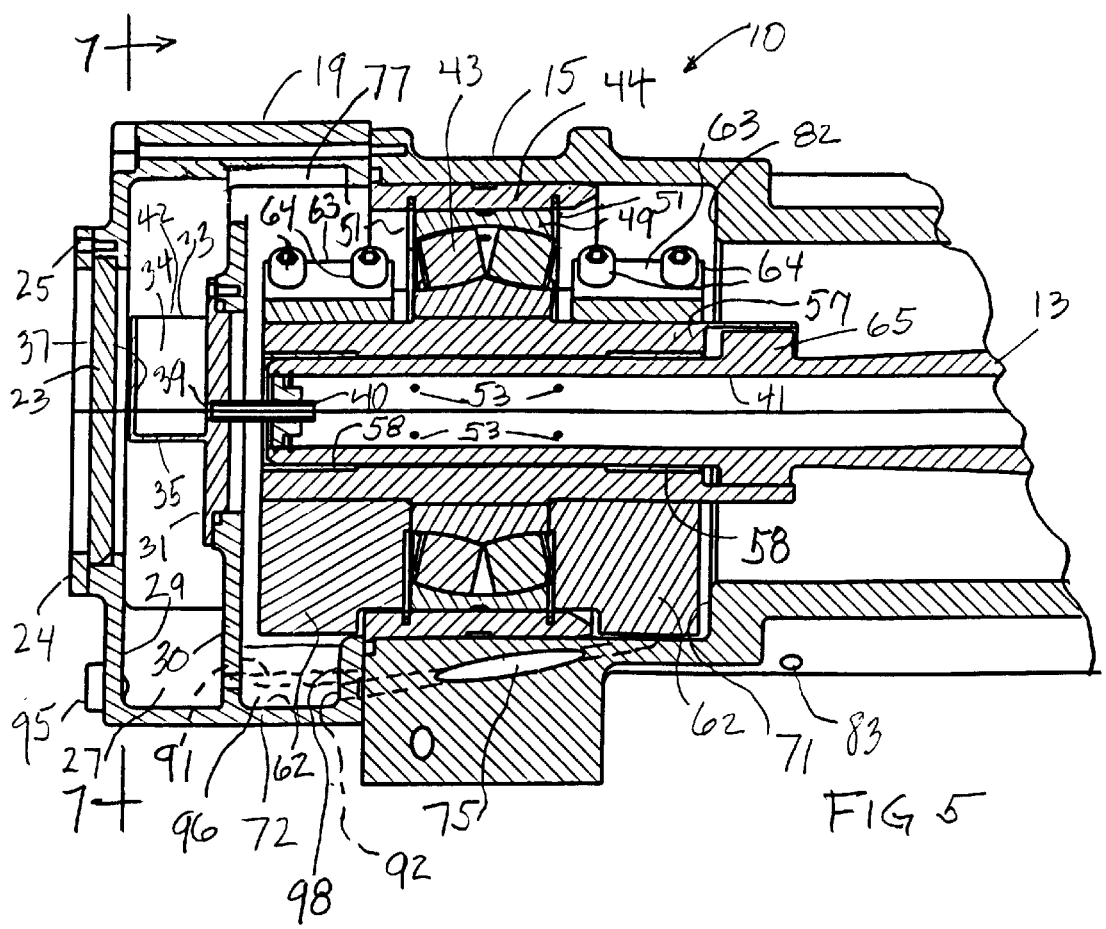
FIG. 5 is an enlarged fragmentary cross sectional view of the left end of FIG. 4.
Figure 6:
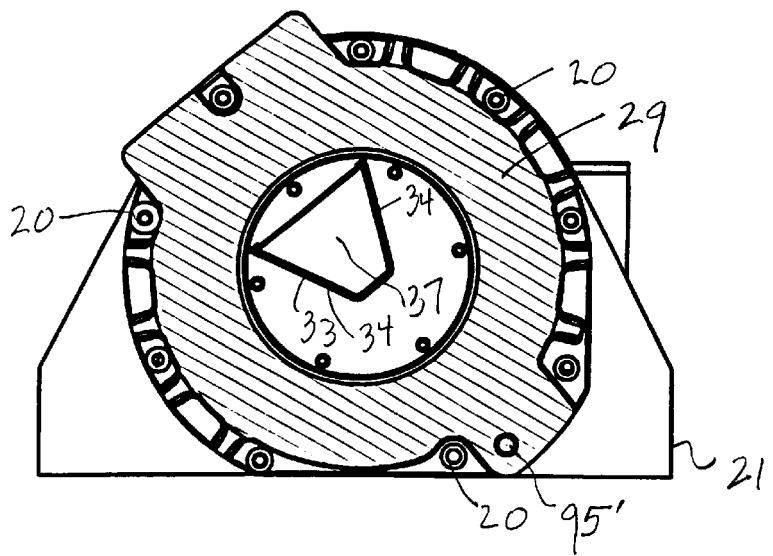
FIG. 6 is a cross sectional view taken substantially along line 6—6 of FIG. 3.

The lubricant which is provided to bearing 43 passes along the outer sides of inner race 50 into bearing 43 and also passes into chambers 71 and 72 (FIGS. 3 and 5) on the opposite sides of bearing 43. Also, the lubricant can leak from slots 60 into chambers 71 and 72. In this respect, there are four clearances in the form of slots 60 spaced at 90° intervals on the outside of outer shaft 57. The lubricant from chamber 71 will pass through a conduit in the form of bore 75 (FIGS. 5, 13 and 16) leading from chamber 71 to chamber 72. The reason that bore 75 is shown as being oblong in FIG. 5 is because of the attitude in which section line 5—5 of FIG. 2 was taken. Thereafter, the weight 62 (FIG. 5) to the left of bearing 43 in chamber 72 will throw the lubricant upwardly into ducts in the form of mirror image troughs 77 (FIGS. 5, 8 and 9) which conduct the lubricant into chamber 27 from which it is thrown into funnel 33 as a result of the vibration of motor 10, and thereafter the above-described circulation of the lubricant is repeated. As can be seen from FIG. 5, trough 77 is formed in end cap 19 as a part of chamber 72. The troughs 77 are tilted slightly downwardly from chamber 72 toward chamber 27 to facilitate the lubricant flow into chamber 27. Some lubricant also passes over wall 30 (FIG. 8) and through the space between ducts 77, and this part of the wall therefore also acts as a duct into chamber 27. In addition, the weights 62 will continuously agitate the lubricant in chambers 71 and 72 and supply it to bearing 43. It is to be noted that in operation the motor 10 is installed on a vibratory screening machine in an attitude which is approximately 45° clockwise from the attitude depicted in FIGS. 8 and 9, and this positions the troughs 77 at favorable attitudes to receive the lubricant from chamber 72 and conduct it to chamber 27. The foregoing 45° clockwise orientation also positions the funnel 33 in a vertical attitude with its open top extending substantially horizontally.

Figure 9:
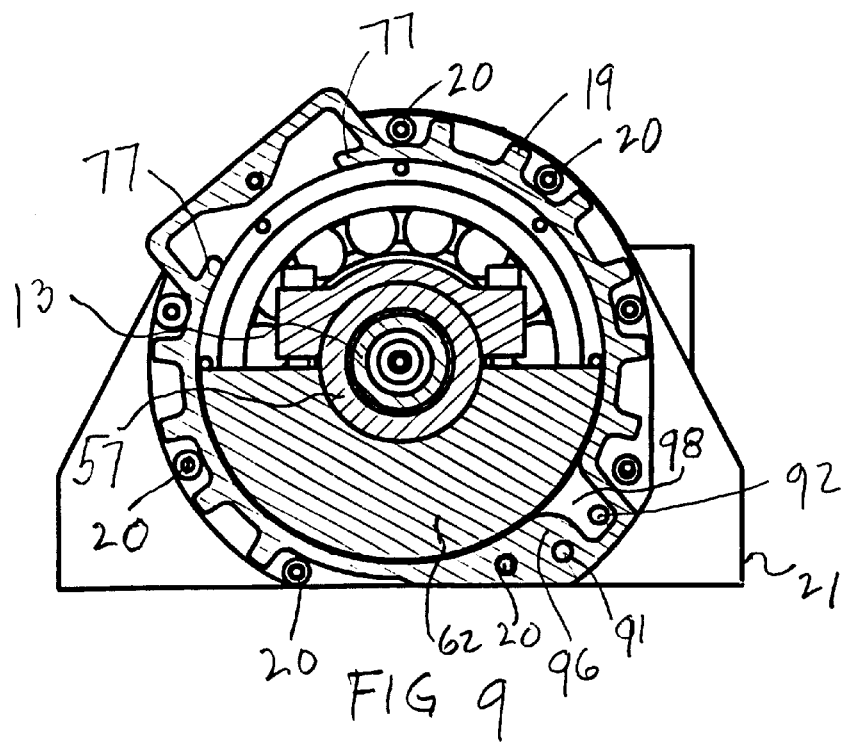
FIG. 9 is a cross sectional view taken substantially along line 9—9 of FIG. 3.

In accordance with another aspect of the present invention, the two lubricant chambers 27 and 27' on opposite ends of the motor 10 are in communication with each other in order to equalize the lubricant level therebetween by a conduit in the nature of a series of bores. In this respect, bore 80 (FIGS. 11, 12, 16, 17 and 18) along with associated bores extend between chamber 27 in the left end of cap 19 and chamber 27' in the right end cap 19'. More specifically, as can be seen from FIG. 18, the bore 80 is located in elongated substantially rectangular solid portion 86 of housing 11, and it includes a plug 81 at its end in wall 82 (FIGS. 3, 5, 11 and 18). A cross bore 83 (FIG. 18) is in communication with bore 80, and cross bore 83 is in communication with bore 84 which is in communication with bore 85 through cross bore 87. Bore 87 is plugged at 89. It is the outlet 90 of bore 85 which is in communication with chamber 27 via bore 91 (FIGS. 7, 8 and 9). In this respect, bore 91 (FIGS. 6 and 9) in end cap 19 lines up with the outlet 90 of bore 85, and bore 91 is in communication with chamber 27. Bore 91 is in a solid portion 96 (FIGS. 5, 8 and 9) in end cap 19, and it extends through wall 30 and wall 98 (FIGS. 5 and 9) which are part of solid portion 96. A mirror image counterpart series of bores are positioned in the right end 15' of housing 11 and in end cap 19' for effecting communication between bore 80 and chamber 27'. Therefore, there is communication of lubricant between the two ends of motor 10, and such communication is between chambers 27 and 27'. There is also a bore 92 (FIGS. 5 and 9) in wall 98 of end cap 19 which lines up with conduit 75 to thereby conduct lubricant from chamber 71 to chamber 72. A drain plug 95 (FIGS. 1 and 5) is located in end cap 19 for the purpose of closing bore 95' used to drain lubricant. The preferred lubricant which is used is known as turbine 68 oil.

While a preferred embodiment of the present invention has been disclosed, it will be appreciated that it is not limited thereto but may be otherwise embodied within the scope of the following claims.

What is claimed is:

1. A vibratory motor comprising a housing having first and second housing ends, a main shaft in said housing, first and second ends on said main shaft in said first and second housing ends, respectively, first and second outer shafts encircling said first and second ends of said main shaft, respectively, first and second keyed slidable connections between said first and second ends of said main shaft and said first and second outer shafts, respectively, and first and second bearings on said first and second outer shafts in said first and second housing ends, respectively.

2. A vibratory motor as set forth in claim 1 wherein said first and second outer shafts are mounted against axial movement in said first and second housing ends, respectively.

3. A vibratory motor as set forth in claim 1 including first and second lubricant chambers proximate said outer ends of said first and second ends of said main shaft, respectively.

4. A vibratory motor as set forth in claim 3 including first and second funnels in said first and second lubricant chambers, respectively.

5. A vibratory motor as set forth in claim 4 including first and second end caps on said first and second housing ends, respectively, and said first and second funnels being mounted within said first and second end caps, respectively.

6. A vibratory motor as set forth in claim 4 including first and second conduits leading from said first and second funnels, respectively, to said first and second ends of said main shaft, respectively.

7. A vibratory motor as set forth in claim 6 wherein said first and second ends of said main shaft are hollow and are in communication with said first and second conduits, respectively.

8. A vibratory motor as set forth in claim 7 including first and second bores in said first and second ends of said main shaft, respectively, radially inwardly of said first and second outer shafts, respectively.

9. A vibratory motor as set forth in claim 8 including first and second clearances between said first and second outer shafts and said first and second ends, respectively, of said main shaft in communication with said first and second bores, respectively.

10. A vibratory motor as set forth in claim 9 including third and fourth bores in said first and second outer shafts, respectively, in communication with said first and second clearances, respectively, first and second elongated slots in said outer shaft in communication with said third and fourth bores, respectively, said first and second elongated slots being positioned between said first and second outer shafts and said first and second bearings, respectively.

11. A vibratory motor as set forth in claim 10 including third and fourth lubricant chambers on opposite sides of each of said first and second bearings, and fifth and sixth conduits between each of said third and fourth lubricant chambers.

12. A vibratory motor as set forth in claim 11 including first and second eccentric weights on each of said first and second ends of said main shaft, respectively, in said third and fourth lubricant chambers, respectively.

13. A vibratory motor as set forth in claim 12 including at least one duct between each of said fourth chambers and a first and second chamber adjacent thereto.

14. A vibratory motor comprising a housing having first and second housing ends, a shaft in said housing, first and second ends on said shaft in said first and second housing ends, respectively, first and second bearings on said first and second ends of said shaft, respectively, first eccentric weights on opposite sides of said first bearing, second eccentric weights on opposite sides of said second bearing, first lubricant chambers on opposite sides of said first bearing, second lubricant chambers on opposite sides of said second bearing, a first conduit connecting said first lubricant chambers, a second conduit connecting said second lubricant chambers, a third lubricant chamber proximate one of said first lubricant chambers on the opposite side of said one first lubricant chamber from said first bearing, a fourth lubricant chamber proximate one of said second lubricant chambers on the opposite side of said one second lubricant chamber from said second bearing, at least one first duct between said one first lubricant chamber and said third lubricant chamber, and at least one second duct between said one second lubricant chamber and said fourth lubricant chamber.

15. A vibratory motor as set forth in claim 14 wherein said first eccentric weights are in each of said first chambers, and wherein said second eccentric weights are in each of said second chambers.

16. A vibratory motor as set forth in claim 14 including a lubricant conduit extending between said third and fourth lubricant chambers.

17. A vibratory motor as set forth in claim 16 wherein said first eccentric weights are in each of said first chambers, and wherein said second eccentric weights are in each of said second chambers.

18. A vibratory motor as set forth in claim 15 wherein said first and second eccentric weights distribute lubricant to said first and second bearings, respectively.

19. A vibratory motor comprising a housing having first and second housing ends, a shaft in said housing, first and second shaft ends on said shaft in said first and second housing ends, first and second bearings on said first and second shaft ends, respectively, first and second eccentric weights on said first and second shaft ends, respectively, first and second lubricant chambers proximate said first and second shaft ends, respectively, and a lubricant conduit extending between said first and second lubricant chambers.

20. A vibratory motor as set forth in claim 19 including third and fourth lubricant chambers on opposite sides of said first bearing, and fifth and sixth lubricant chambers on opposite sides of said second bearing, a second lubricant conduit extending between said third and fourth chambers, and a third lubricant conduit extending between said fifth and sixth chambers.

21. A vibratory motor as set forth in claim 20 wherein said first eccentric weights comprise third and fourth eccentric weights in said third and fourth lubricant chambers, respectively, and wherein said second eccentric weights comprise fifth and sixth eccentric weights in said fifth and sixth lubricant chambers, respectively.

22. A vibratory motor comprising a housing having first and second housing ends, a shaft in said housing, first and second shaft ends on said shaft in said first and second housing ends, respectively, first and second bearings on said first and second shaft ends, respectively, a first lubricant chamber proximate said first shaft end, a second lubricant chamber proximate said second shaft end, a third lubricant chamber between said first bearing and said first lubricant chamber, a fourth lubricant chamber between said second bearing and said second lubricant chamber, a first eccentric weight on said first shaft end in said third lubricant chamber, a second eccentric weight on said second shaft end in said fourth lubricant chamber, a first duct between said third lubricant chamber and said first lubricant chamber, and a second duct between said fourth lubricant chamber and said second lubricant chamber.

23. A vibratory motor as set forth in claim 22 including a lubricant conduit between said first and second lubricant chambers.

24. A vibratory motor as set forth in claim 22 including third and fourth lubricant chambers on opposite sides of said first bearing, and fifth and sixth lubricant chambers on opposite sides of said second bearing, a second lubricant conduit extending between said third and fourth chambers, and a third lubricant conduit extending between said fifth and sixth chambers.

25. A vibratory motor as set forth in claim 24 including a lubricant conduit between said first and second lubricant chambers.

26. A vibratory motor as set forth in claim 24 including a second lubricant conduit between said third lubricant chamber and said fifth lubricant chamber, and a third lubricant conduit between said fourth lubricant chamber and said sixth lubricant chamber.

27. A vibratory motor as set forth in claim 26 including a lubricant conduit between said first and second lubricant chambers.

28. A vibratory motor comprising a housing having first and second housing ends, a main shaft, first and second main shaft ends on said main shaft in said first and second housing ends, respectively, first and second outer shafts on said first and second main shaft ends, respectively, first and second clearances between said first and second main shaft ends and said first and second outer shafts, respectively, first and second bearings on said first and second outer shafts, respectively, first and second lubricant chambers proximate said first and second main shaft ends, respectively, a hollow interior in said main shaft, first and second conduits between said hollow interior of said main shaft, said first and second lubricant chambers, respectively, a plurality of first and second bores in said first and second main shaft ends, respectively, effecting communication between said hollow main shaft and said first and second clearances, respectively, a plurality of third and fourth bores in said first and second outer shafts, respectively, between said first and second clearances, respectively, and said first and second bearings, respectively, third and fourth lubricant chambers between said first and second bearings, respectively, and said first and second chambers, respectively, first and second eccentric weights in said third and fourth chambers, respectively, a first duct between said third lubricant chamber and said first lubricant chamber, and a second duct between said fourth lubricant chamber and said second lubricant chamber.

29. A vibratory motor comprising a housing, a main shaft in said housing, a hollow interior in said main shaft, a shaft end on said main shaft, an outer shaft on said shaft end, a first clearance between said shaft end and said outer shaft, a plurality of first bores between said hollow interior and said first clearance, a bearing mounted on said outer shaft, a second clearance between said outer shaft and said bearing, and a plurality of second bores in said outer shaft between said first and second clearances.

30. A vibratory motor as set forth in claim 29 including a keyed slip connection between said main shaft and said outer shaft.

31. A vibratory motor comprising a housing having a housing end, a main shaft in said housing, an end on said main shaft in said housing end, an outer shaft encircling said end of said main shaft, a keyed slidable connection between said end of said main shaft and said outer shaft, and a bearing on said outer shaft in said housing end.

32. A vibratory motor as set forth in claim 31 wherein said outer shaft is mounted against axial movement in said housing end.

33. A vibratory motor as set forth in claim 31 including a lubricant chamber proximate said outer end of said main shaft.

34. A vibratory motor as set forth in claim 33 including a funnel in said lubricant chamber.

35. A vibratory motor as set forth in claim 34 including an end cap on said housing end, and said funnel being mounted within said end cap.

36. A vibratory motor as set forth in claim 34 including a conduit leading from said funnel to said end of said main shaft.

37. A vibratory motor as set forth in claim 36 wherein said end of said main shaft is hollow and is in communication with said conduit.

38. A vibratory motor as set forth in claim 37 including bores in said end of said main shaft radially inwardly of said outer shaft.

39. A vibratory motor as set forth in claim 38 including a clearance between said outer shaft and said end of said main shaft in communication with said bores.

40. A vibratory motor as set forth in claim 39 including second bores in said outer shaft in communication with said clearance, at least one elongated slot in said outer shaft in communication with said second bores, said at least one elongated slot being positioned between said outer shaft and said bearing.

41. A vibratory motor as set forth in claim 40 including second lubricant chambers on opposite sides of said bearing, and a conduit between said second lubricant chambers.

42. A vibratory motor as set forth in claim 41 including an eccentric weight on said outer shaft in said second lubricant chambers.

43. A vibratory motor as set forth in claim 42 including at least one duct between said lubricant chamber and one of said second chambers adjacent thereto.

44. A vibratory motor comprising a housing having a housing end, a shaft in said housing, a shaft end on said shaft in said housing end, a bearing on said shaft end, a first lubricant chamber proximate said shaft end, a second lubricant chamber between said bearing and said first lubricant chamber, an eccentric weight on said shaft end in said second lubricant chamber, and an unrestricted duct between said second lubricant chamber and said first lubricant chamber.

* * * * *

UNITED STATES PATENT AND TRADEMARK OFFICE
CERTIFICATE OF CORRECTION

PATENT NO.    : 6,580,189 B2
DATED         : June 17, 2003
INVENTOR(S)   : James A. Mooney It is certified that error appears in the above-identified patent and that said Letters Patent is hereby corrected as shown below:

Drawings,
Eight Sheets of formal drawings have been substituted for the eight sheets of informal drawings printed with the patent.

Column 8,
Lines 39-45, change claim 24 to read:

-- 24. A vibratory motor as set forth in claim 22 including a fifth lubricant chamber on the opposite side of said first bearing from said third lubricant chamber, a third eccentric weight mounted on said first shaft end and in said fifth lubricant chamber, and a sixth lubricant chamber on the opposite side of said second bearing from said fourth lubricant chamber, and a fourth eccentric weight mounted on said second shaft end in said sixth lubricant chamber. --

Signed and Sealed this

Seventeenth Day of February, 2004

JON W. DUDAS
*Acting Director of the United States Patent and Trademark Office*

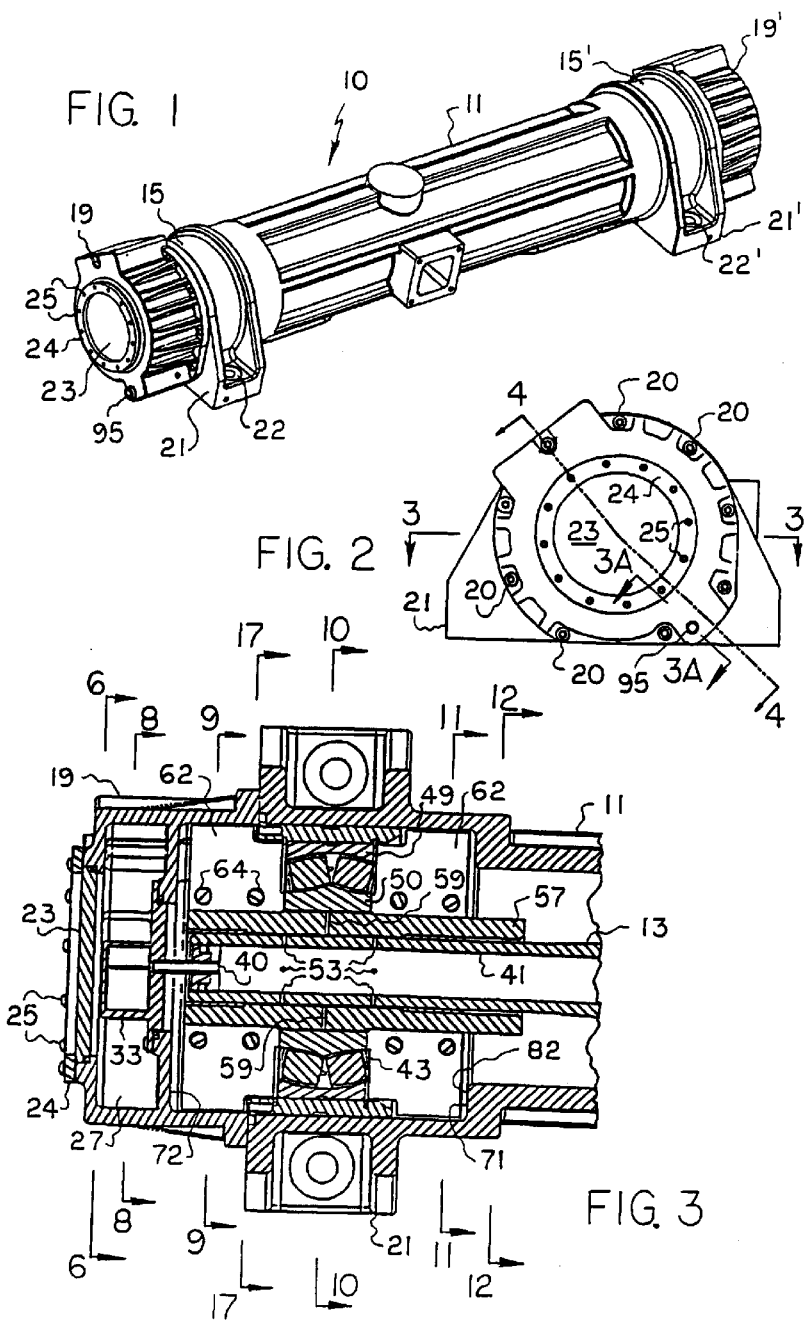

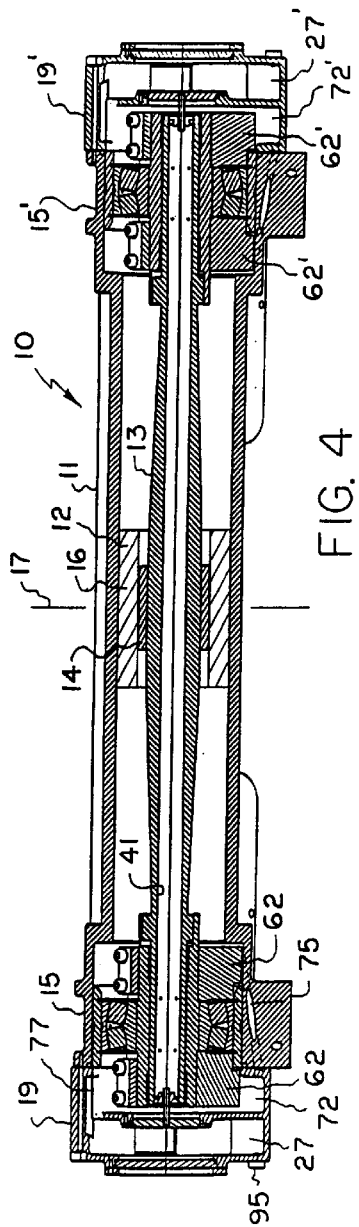
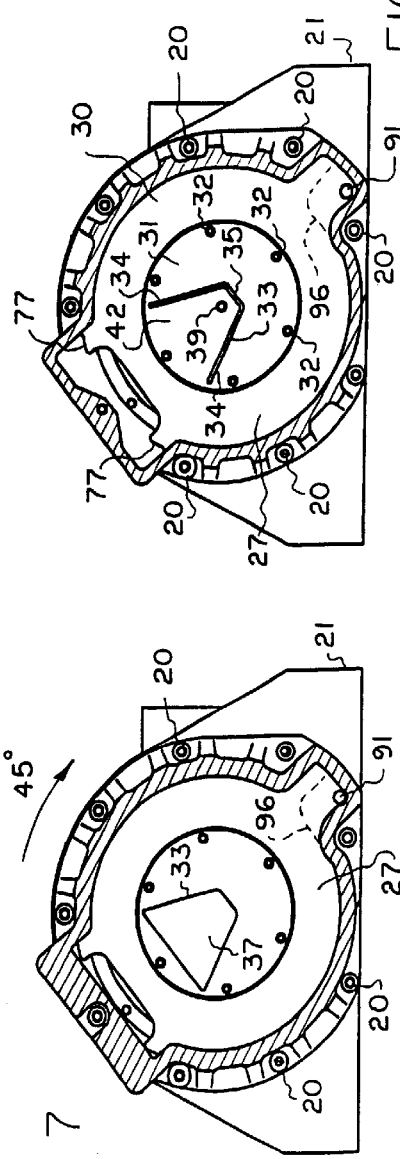
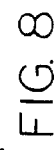
FIG. 4
FIG. 7
FIG. 8